Sept. 19, 1933.  A. G. HEWITT  1,927,608
CUTTING APPARATUS
Filed Nov. 26, 1930   2 Sheets-Sheet 1
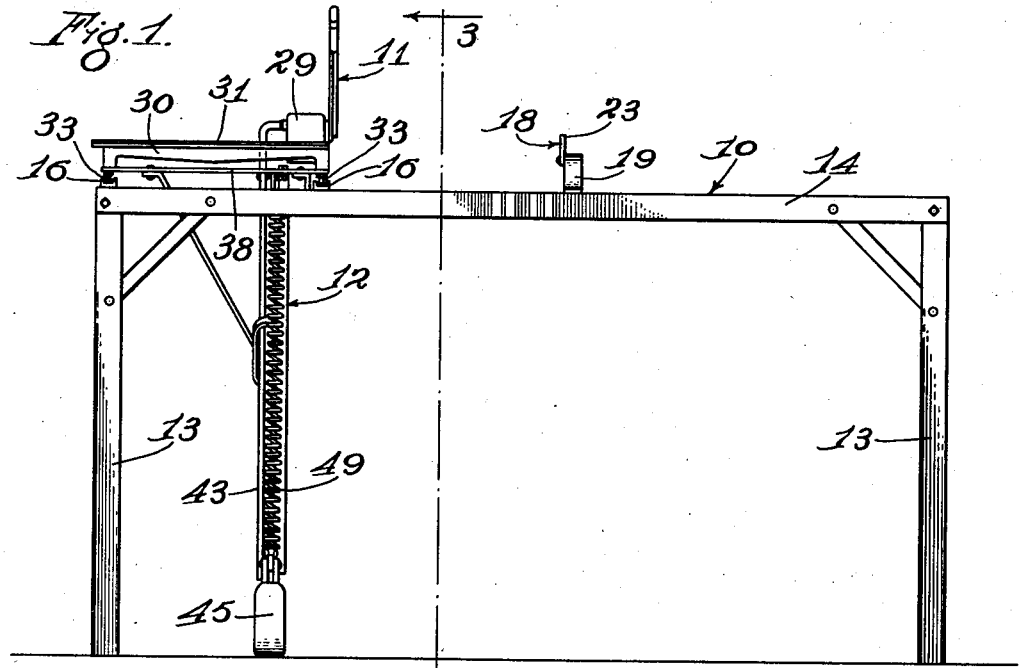
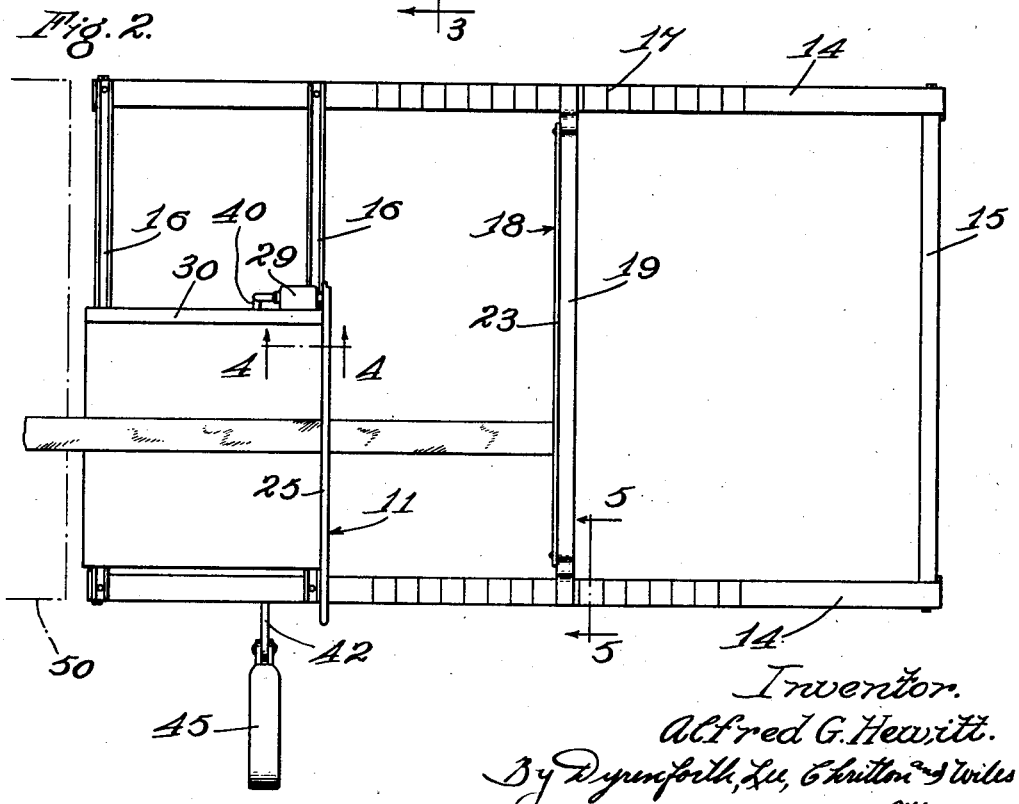
Inventor.
Alfred G. Hewitt.
By Dyrenforth, Lee, Chritton & Wiles
Attys.

Sept. 19, 1933.   A. G. HEWITT   1,927,608
CUTTING APPARATUS
Filed Nov. 26, 1930   2 Sheets-Sheet 2
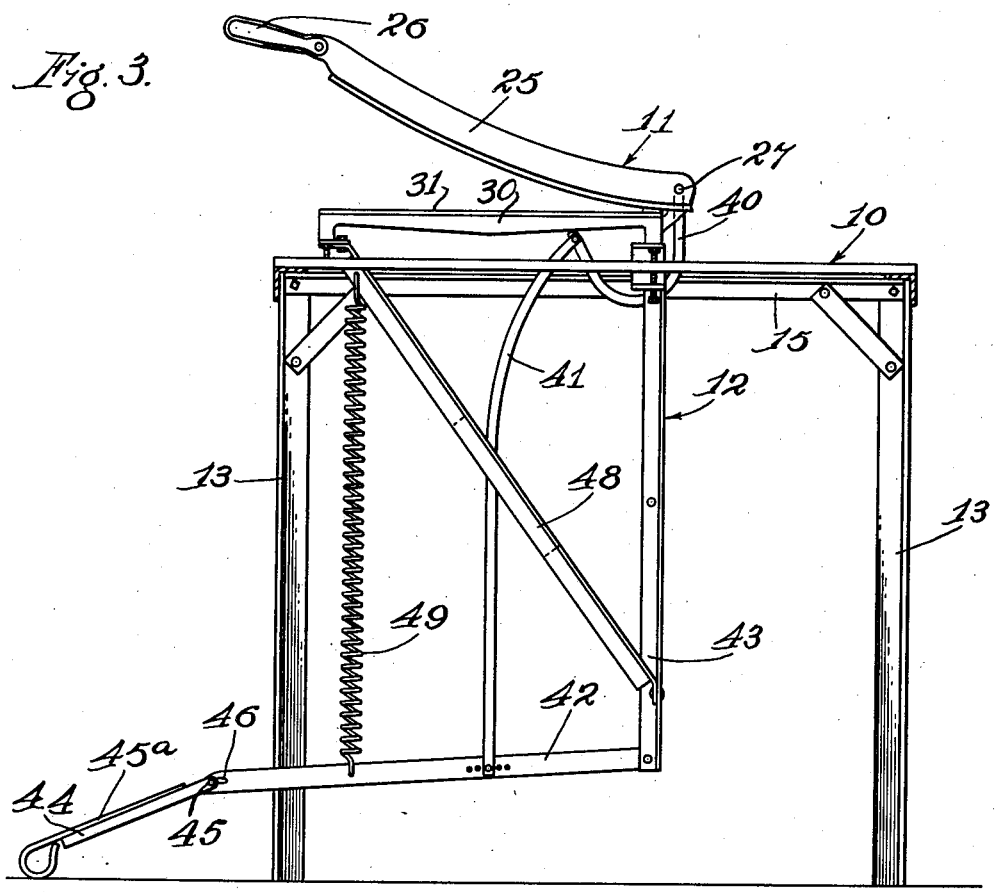
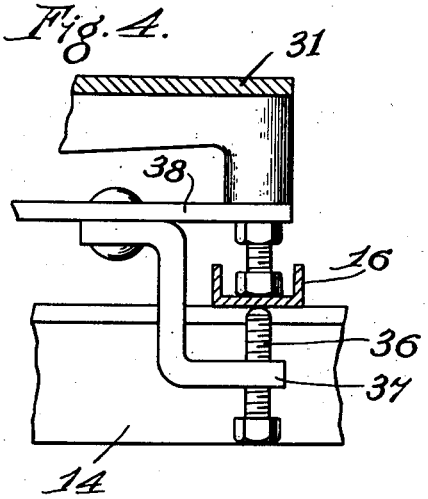
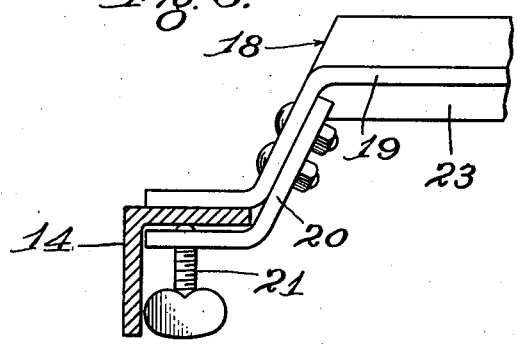
Inventor.
Alfred G. Hewitt.

Patented Sept. 19, 1933

1,927,608

UNITED STATES PATENT OFFICE 1,927,608

CUTTING APPARATUS

Alfred G. Hewitt, Chicago, Ill., assignor to The Visking Corporation, Chicago, Ill., a corporation of Virginia Application November 26, 1930
Serial No. 498,499

4 Claims. (Cl. 164—44)

The invention relates to cutting apparatus for cutting a strand or tube of material into predetermined lengths.

The invention is particularly adapted to be embodied in apparatus for severing cellulose sausage casings which are formed by extruding and regenerating viscose and then drying it after treating it with a hygroscopic agent, the casing being cut into predetermined lengths which are subsequently stuffed in the usual manner.

Apparatus embodying a preferred form of the invention is preferably constructed in two units, one of which is a table having an adjustable stop which is utilized in connection with the cutting mechanism to measure the casings into predetermined lengths. The other unit is detachably and slidably secured to the table and comprises a cutting device and mechanism for actuating it.

The cutting device and the mechanism for actuating it are adjustable as a unit on the frame to bring the cutting device into alinement with the tubes which are to be cut into predetermined lengths, these tubes being supported on a table adjacent the improved cutting apparatus.

The objects and advantages of the invention will become apparent as the following detailed description progresses, reference being had to the accompanying drawings, wherein Figure 1 is a side elevation of the apparatus which embodies the invention.

Fig. 2 is a plan view of the improved apparatus.

Fig. 3 is a section taken on line 3—3 of Fig. 1.

Fig. 4 is an enlarged section taken on line 4—4 of Fig. 2, and

Fig. 5 is an enlarged section taken on line 5—5 of Fig. 2.

Referring to the drawings, wherein apparatus embodying the preferred form of the invention is illustrated, the reference character 10 designates generally a frame or table upon which a cutting device 11 is adjustably and detachably mounted. The cutting device 11 has actuating mechanism 12 depending therefrom.

The frame or table 10 is preferably formed from angle irons and, in this instance, comprises legs 13 supporting a substantially rectangular top formed from longitudinally extending angle irons 14 and transversely extending angle irons 15. Rigidly secured to the angle irons 14 are channel members 16.

As best shown in Fig. 2, the angle irons 14 are provided with suitable markings or indicia 17 to provide a scale for measuring the lengths of casing which are to be cut from a relatively long casing.

Slidably mounted upon the angle irons 14 is a stop member 18 comprising a bent bar 19 which has its ends resting upon the top surfaces of the angle irons 14 (see Fig. 5). Secured to the ends of the bar 19 are bent bars 20 through which set screws 21 are screw-threaded, the construction being such that the set-screws 21 may be manipulated to secure the stop member 18 into adjusted positions upon the angle irons 14. Fixed to the central portion of the bar 19 is a vertically disposed plate 23. The purpose of this construction will presently appear.

The cutting device 11 preferably is in the form of an "allegator" shear and comprises an arcuate blade 25 which is provided with a handle 26 at one end and has its other end rigidly secured to a pin 27 journaled in a bearing 29 fixed to a cutting table 30.

The top of the cutting table is preferably provided with a metallic plate 31 which co-operates with the blade 25 to sever the tubing. Bolts 33 screw-threaded into the bottom surface of the cutting table 30 ride in the channels 16, the arrangement being such that the cutting device may be displaced transversely of the frame 10 as a unit. Means is provided for securing the table top in adjusted positions upon the frame. This means preferably comprises a set screw 36 engageable with the bottom surface of one of the channels 16 (see Fig. 4). The set screw 36 is screw-threaded through a bent bar 37 fixed to one of a plurality of bars 38 which form part of the cutting table 30.

Formed integral with the pin 27, or rigidly secured thereto, is an arcuate crank arm 40, the free end of which is connected by a link 41 to a lever 42. One end of the lever 42 is pivoted to the lower end of a vertically disposed angle iron 43 which has its upper end rigidly secured to one of the bars 38. The free end of the lever 42 has one end of a foot treadle 44 pivoted thereto by a pin 45 which rides in a slot 46 formed in the lever 42. The foot lever 44 comprises a sheet metal member 45a and is curved at one end to provide an arcuate surface resting upon the floor.

A brace 48 extends from the lower end of the angle iron 43 to one of the bars 38 and a tension spring 49 extending between the brace 48 and the lever 42 tends to rotate the lever 42 in a clockwise direction (Fig. 3). The spring is adapted to hold the blade 25 in its uppermost position when no pressure is applied to the foot treadle 44.

It is obvious that the mechanism for actuating the blade 25 is carried by the cutting table 30 which is part of the cutting device 11, and it is readily understood that the cutting device 11 and the actuating mechanism 12 may be displaced transversely of the frame or table 10 to be secured in any desired position upon the table by the set screw 36. The advantage of this construction is that the cutting device 11 may be brought into alinement with relatively long lengths of casing disposed upon a table 50 adjacent which the frame 10 is placed. The casings are withdrawn in relatively long lengths from a drier and are arranged in piles upon the table 50. If the casings to be cut extend along one side of the table, the cutting device must be moved into alinement therewith or the operator will have to arrange the lengths to be cut diagonally of the frame 10 and the knife or blade 25 will sever the casings diagonally.

It will be noted that the cutting device 11 is quickly detachable from the frame 10 so that it may be quickly and easily removed therefrom if it is necessary to make repairs, etc.

The operation of the above described apparatus is substantially as follows: When relatively long casings are to be cut into predetermined lengths thereof, the stop member 18 is brought into adjusted position with respect to the blade 25, use being made of the markings or indicia 17 to space the stop member 18 the desired distance from the blade. A casing is then advanced from the left (Fig. 2) across the cutting table 30 until it abuts against the vertically disposed plate 23 whereupon the operator steps upon the foot treadle 44 and causes the blade 25 to sever the casing. This operation is repeated until the casings have all been cut into predetermined lengths.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. Apparatus of the kind described comprising a frame, a cutting device comprising a movable blade and a co-acting cutting edge movably mounted on the frame and adapted to be brought into a plurality of parallel positions by movement transversely of said frame, and means carried by said cutting device for actuating it.

2. Apparatus of the kind described comprising a frame, an allegator shear mounted on said frame, means for securing said shear in a plurality of parallel positions transversely of said frame, and means carried by said shear for actuating it, said shear and cutting means being slidable transversely of said frame.

3. Apparatus of the kind described comprising a frame, an auxiliary frame slidably mounted on the first mentioned frame, means for securing the auxiliary frame in a plurality of adjusted positions transversely of the first mentioned frame, an allegator shear carried by said auxiliary frame and foot operated means carried by said auxiliary frame for actuating said shear.

4. Apparatus of the kind described comprising a frame, an auxiliary frame slidably mounted on the first mentioned frame, means for securing said auxiliary frame in a plurality of adjusted positions transversely of the first mentioned frame, a cutting member carried by said auxiliary frame, means carried by said auxiliary frame for actuating said cutting member, and a stop adjustable longitudinally of the first mentioned frame.

ALFRED G. HEWITT.